United States Patent
Bletsos et al.

(10) Patent No.: US 6,372,352 B1
(45) Date of Patent: Apr. 16, 2002

(54) DELAMINATION-RESISTANT LAMINATED GLASS STRUCTURES

(75) Inventors: Ioannis V. Bletsos, Midlothian, VA (US); John W. Turnbull, Wilmington, DE (US); Bert C. Wong, Marietta, OH (US)

(73) Assignee: E. I. du Pont de Nemours and Co., Wilmington, DE (US)

( * ) Notice: Subject to any disclaimer, the term of this patent is extended or adjusted under 35 U.S.C. 154(b) by 0 days.

(21) Appl. No.: 09/622,761
(22) PCT Filed: Mar. 4, 1998
(86) PCT No.: PCT/US98/04246
 § 371 Date: Oct. 20, 2000
 § 102(e) Date: Oct. 20, 2000
(87) PCT Pub. No.: WO99/44820
 PCT Pub. Date: Sep. 10, 1999
(51) Int. Cl.[7] .............. B32B 17/10; B05D 3/12; C08F 16/06
(52) U.S. Cl. ............ 428/441; 428/436; 428/437; 428/442; 427/369; 427/370; 525/56
(58) Field of Search ............ 428/441, 442, 428/436, 437, 426; 525/56; 427/369, 370

(56) References Cited

U.S. PATENT DOCUMENTS 5,886,075 A * 3/1999 Keane et al. ............ 524/308

* cited by examiner

Primary Examiner—Robert Dawson
Assistant Examiner—Michael J. Feely
(74) Attorney, Agent, or Firm—Kevin S. Dobson

(57) ABSTRACT

A laminar structure comprised of at least one layer of glass and a sheet of plasticized PVB containing an adhesion control agent is provided wherein delamination resulting from air being from air being dispersed or entrapped and dissolved in the PVB is controlled by use of a surface energy modifying agent, said surface energy modifying agent being selected to provide a total surface energy for the sheet of less than 52 dynes/cm.

13 Claims, 1 Drawing Sheet

DELAMINATION-RESISTANT LAMINATED GLASS STRUCTURES

BACKGROUND OF THE INVENTION

Laminators are constantly being challenged to reduce or eliminate visual defects in laminated glass structures. Some defects can be directly attributed to glass quality but many are considered to be associated with the laminating process and more specifically with the commonly used polyvinylbutyral (PVB) interlayer. Defects can look like bubbles or pockets of air with elongated worm-like or dendritic shapes. Elongated worm-like and dendritic defects are often referred to as delamination. Some defects are visible immediately after autoclaving, but others develop hours or days after lamination. Laminators who use vacuum for de-airing tend to experience higher defect rates in warm weather.

Traditionally, delamination is viewed as the result of adhesive bond failure between the glass and the PVB interlayer. That is, the adhesive forces cannot withstand the stresses that are due to mismatches in the glass as well as gaps and pinches. A typical explanation for defects that are near a laminate's edge, is that the PVB absorbs moisture from the environment, which lowers the adhesion level leading to defect formation. Therefore, it is rationalized that during warm and humid seasons, moisture is absorbed at a higher rate, and hence causes more defects.

In the laminating industry there is general agreement that gaps and pinches do lead to defects. In fact gaps of approximately 0.1 mm in height over a distance of 5 cm are suspects for causing defects. The load required to achieve a 0.1 mm gap or pinch can be calculated from mechanical considerations, and it is a surprisingly low, 1.0 N/cm for 2.1-mm thick glass. For this reason, adhesive forces cannot explain the formation of most defects.

If the adhesion level is primarily responsible for defects, then higher adhesion levels should be able to overcome more stress, and hence, would accommodate larger gaps and pinches without causing a defect. However, our findings have shown this not to be true.

With respect to moisture absorption, the adhesive interlayer absorbs moisture from the environment until equilibrium is reached. The equilibrium level depends on the relative humidity and may differ for different interlayers. The mechanism for moisture absorption is diffusion, which means that the concentration of the diffusant is highest at the phase boundary (i.e., at the laminate's edge). A typical moisture profile of a PVB laminate exposed to 95% relative humidity at 40° C. for one week shows that only interlayer within 3–4 mm from the edge has moisture higher than 1.5%, and the moisture level hardly changes about 8 mm in from the edge. Most of the observed defects occur about 3–12 mm away from the edge and some extend slightly farther inwards. Very few defects are open to the edge where the moisture level is highest and where one would expect to have the lowest level of adhesion.

It is possible to adjust the adhesivity of the PVB interlayer so that even when laminated at high moisture, the final adhesion is suitable for use in automobile windshields. However, laminates made this way would fail if they are installed into automobiles which are driven in or exposed to high ambient temperatures. Bubbles form readily at temperatures less than 100° C. in laminates where the PVB interlayer has been equilibrated prior to lamination to a relative humidity higher than 50%. These laminates most likely would not pass the bake test or the boil test required by national and international standards (e.g., ANSI Z26, JIS R-3212, EC R-43, and others).

Another reason moisture intrusion does not explain many of the defects is that even in the absence of high moisture, adhesion at 30° C. is only a fraction of what it is at room temperature. Increasing the adhesion between the glass and the adhesive interlayer at room temperature, therefore, would not help to eliminate defects which tend to occur at higher temperatures. Further, correlation between data from tests run at temperatures well below room temperature, such as the pummel test, and delaminations is at least questionable.

We have found that the presence of air plays a most significant role in defect formation in laminated glass. De-airing and edge seal must be as complete as possible in pre-pressed laminates before autoclaving in order to avoid defects. However, optimizing de-airing alone does not appear to solve the delamination problem completely.

The typical approach in attempting to solve delamination problems has been to include various additives in the adhesive sheet to increase the strength of the adhesive bond between the sheet and the glass plate. While such approaches have been successful in changing the adhesive level, and to some extent reducing delaminations, increasing adhesion upsets the delicate balance of properties which make laminated products so desirable in automotive and other fenestration applications. It is well known that an adhesion level that is too high can render the laminate monolithic and unable to absorb an impact, or if the adhesion is too low, glass shards fly from the structure on impact. In each instance, changing the adhesion level renders the laminate unacceptable.

It is therefore the object of this invention to provide a laminar structure which is free from objectionable worm-like, dendritic, delamination by imparting delamination resistance without adversely changing the adhesion level or other important properties of the laminar structure.

SUMMARY OF THE INVENTION

In accordance with this invention there is provided a glass/adhesive sheet laminar structure comprising at least one layer of glass and a sheet of plasticized PVB, said PVB having blended therein an adhesion control agent to provide a preselected level of adhesion between said layer of glass and said sheet of PVB which is suitable for use as automobile windshields, side windows and body glass, and incorporating a surface energy modifying agent in the bulk of the polymer in an amount so that said sheet of polyvinylbutyral interlayer has a total surface energy of less than about 52 dynes/cm.

It has now been found that dendritic or worm-like delaminations in PVB laminated structures result from air being dispersed, entrapped or dissolved in the PVB interlayer during autoclaving. The dissolved air when it exceeds its equilibrium solubility in PVB comes out of solution and causes defects to form. These delaminations first appear as tiny bubbles which grow or coalesce to form larger bubbles and eventually worm-like or dendritic delamination. The formation and stability of air bubbles in PVB, like other systems containing two immiscible phases, depend on thermodynamic conditions in which the primary driving force is to reduce the total interfacial area per unit volume between the two phases. That is why small bubbles join to form a single one of greater volume but smaller total interfacial area. The ability of an additive to keep the air dispersed depends primarily on its effectiveness at reducing the surface tension of PVB.

In accordance with this invention delamination is eliminated or substantially reduced by keeping the air dispersed and preventing microbubbles from coalescing and growing into delaminations. This is accomplished by controlling the surface energy in the bulk of the PVB sheeting. Generally, the surface energy should be less than about 52 dynes/cm. Surface energy in the range from about 35 to 50 dynes/cm is efficacious in stabilizing the undissolved air and volatiles without substantially changing the adhesion level between the glass and the PVB interlayer or the balance of properties of the PVB interlayer such as compliance, stiffness, energy-absorbing characteristics so that the laminate may be used in automotive windshield and other automotive applications.

BRIEF DESCRIPTION OF THE DRAWING

In describing the invention, reference will be made to the accompanying drawing in which the FIGURE is a diagrammatic illustration of a jig used for determining the compressive shear strength of a laminate.

DETAILED DESCRIPTION

Figure 1:
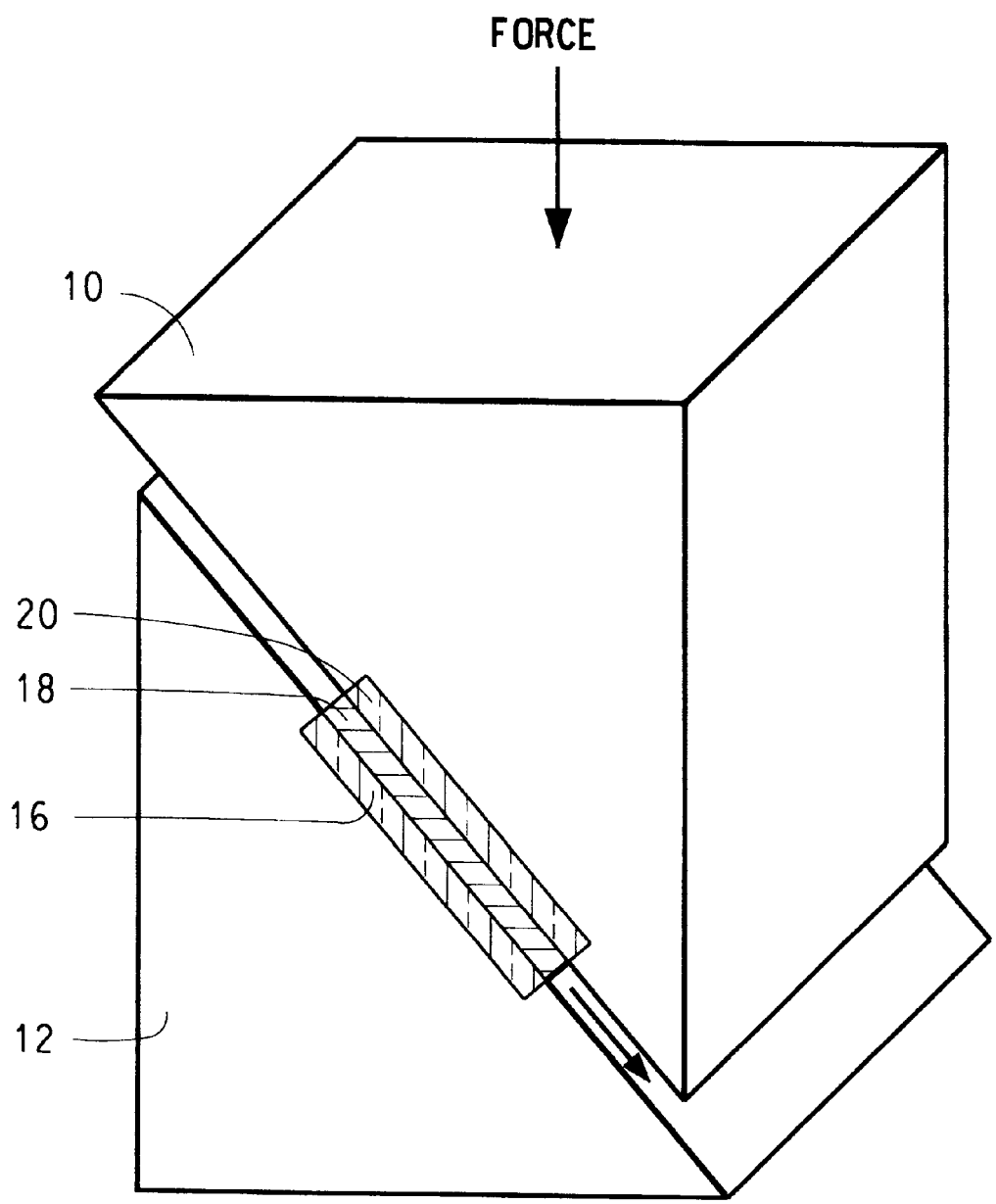

Plasticized PVB sheeting is prepared by processes well known in the art. A preferred process for reparation of plasticized PVB is disclosed in Phillips, U.S. Pat. No. 4,276,351 which is hereby incorporated by reference. A wide variety of adhesion control agents can be used with polyvinylbutyral sheeting. In the instant invention a PVB sheet plasticized with a compatible quantity of ester selected from the group consisting of triethyleneglycol di-n-heptanoate or esters and tetraethylene glycol di-n-heptanoate, or with a compatible quantity of similar branched or unbranched glycol di-esters such as triethylene glycol di-2-ethylbutyrate and triethylene glycol di-2-ethylhexanoate, and contains as an adhesion control agent an alkali or alkaline earth metal carboxylate such as formate, acetate and the like. A process for preparing such sheeting is disclosed in Moynihan, U.S. Pat. No. 4,292,372 which is hereby incorporated by reference. Other suitable adhesion control agents include potassium acetate, magnesium formate, magnesium acetate, magnesium neodecanoate, zinc and calcium salts of various organic acids.

Various surface energy modifying agents can be used in this invention: organically modified silicones such as polyoxyalkylene modified silicones, and more specifically, polyoxyethylene modified silicone oil, polyoxypropylene-modified silicone oil as marketed by OSi Specialties, Inc., under the tradename Silwet®, and various silicone surfactants marketed by Dow Corning, Toray-Dow Corning, various organically modified silanes such as γ-glycidoxypropyltrimethoxy silane, 3,4-expoxycyclohexyl ethyltrimethoxy silane, fluorosurfactants, salts of medium- to long-chain branched or unbranched carboxylic acids with at least 4 carbon atoms such as sodium dodecylsulfate, magnesium neodecanoate, calcium or zinc neodecanoate, magnesium 2-ethylhexanoate and the like. In the examples of this invention, 100 parts of dry PVB flake of nominally 23% by weight of unbutyralated vinyl alcohol groups are mixed with 35–40 parts of tetraethylene glycol di-n-heptanoate plasticizer and a light stabilizer (Tinuvin-P) and an antioxidant which are pre-mixed in the plasticizer continuously in a co-rotating twin-screw extruder. The melt exiting the extruder is at about 215° C. The melt is then passed through a gear pump which pushes it through a cartridge-type melt filter for contamination removal, and then through a slit die and forms a sheeting of 0.76 mm nominal thickness. The total residence time of the melt at about 215° C. in the extruder-gear pump-melt filter-slit die assembly is approximately 20 minutes. Other additives such as the surface energy modifiers and adhesion control additives are added as a side-stream to the main plasticizer feed just before they enter the extruder. Specifically, adhesion control additives are added as an aqueous side-stream to the surface energy modifier side-stream. The two side-streams meet and stay together for up to one minute before entering the main plasticizer feed stream. The temperature of the pipe section where the side streams are mixed is about 52° C. due to the heat from the extruder which is immediately below it. Silanes when mixed with water undergo hydrolysis instantaneously under these conditions. When silanes are used as surface energy modifying agents, it is essential that hydrolyzed silanes be used in this invention in that they tend not to increase adhesion to a level which is undesirable for use in automotive windshields, and they do not lead to sustained increase in extrusion pressure during sustained operations. The modifying agent will usually be incorporated by blending it with the PVB resin. A sufficient amount is added to provide a total bulk surface energy of the PVB of less than about 52 dynes/cm.

In addition to the surface energy modifying agent and adhesion control agent usual adjuvants such as antioxidants, colorants and ultraviolet absorbers which do not adversely affect the functioning of the surface energy modifying agent and adhesion control agent may be included in the PVB composition.

Fabrication of the laminar structures is well known in the art. It is also known that in order to effectively remove most of the air from between the surfaces in the laminar structure, the surface of the PVB sheeting should be roughened. This can be effected mechanically by embossing or by melt fracture during extrusion of the PVB sheet. Retention of the surface roughness is essential to facilitate effective deaeration of the entrapped air during laminate preparation. The surface roughness, Rz, is expressed in microns by a 10-point average roughness in accordance with ISO-R468 of the International Organization for Standardization. For sheeting having a thickness greater than about 0.76 mm, Rz's of up to 60 microns are sufficient to prevent air entrapment. To prevent blocking a minimum Rz of about 20 microns is needed if the sheeting is to be wound up in a roll without interleaving or without anti-blocking agents. The surface roughness of thermoplastic resin sheeting and the methods of characterization and quantification of the surface roughness are described in ANSI/ASME B46.1(1995). The boundary region between two immiscible phases, like air and PVB, is called "interface." On a macroscopic scale the interface represents an abrupt transition in the chemical and physical characteristics of one bulk phase to the other. On a microscopic scale this transition occurs over the distance of only a few molecular dimensions. Here, with respect to bubbles and delaminations in PVB/glass laminates, according to the common practice, since one phase is air, we use the term "surface." Specifically, the "surface energy" of PVB is the same as the "interfacial energy" of PVB at any PVB/air interface, wherever such an interface may exist: at the boundary of a bubble or a delamination in a laminate, or at the interface of a PVB sheeting with its surroundings. Since the air that causes defects to form in laminates is dissolved or dispersed throughout the bulk of the PVB, the surface energy of PVB in the bulk controls the formation of defects. As described below, we measure the surface energy of PVB not in the bulk, which would be an impossible measurement, but at its outer boundary with air. Air dissolved or dispersed in PVB will nucleate small holes when it exceeds its equilibrium solubility. These minute defects, depending on the amount of air present, may grow to form bubbles. The growth of a spherical bubble is controlled by the pressure difference $\Delta P$ between the inside and the outside of the bubble, the surface energy $\gamma$ of the surrounding PVB and the radius r of the bubble. This is described by the Laplace equation $$\Delta P = 2\gamma/r \qquad (\text{Eq. 1})$$

The pressure inside a bubble is generated by the air dispersed or dissolved in PVB, and it is always higher than outside. The pressure outside the bubble is the weight of the polymer and the pressure imposed on the polymer surface by its surroundings. This may be atmospheric pressure, for PVB at ambient conditions, or 10 bar during the torture test which is described later herein. The internal pressure of the bubble is balanced by the external pressure, the viscoelastic nature of PVB and the interfacial forces acting around the bubble. By introducing appropriate additives which reduce the surface tension of PVB we minimize $\Delta P$ which is the driving force leading to bigger bubbles and delamination.

$\Delta P$ is inversely proportional to the radius of the bubble, and as a consequence, the pressure in a small bubble is greater than in a large one. The pressure difference between two bubbles with radii $r_1 > r_2$ is $$\Delta P = 2\gamma(1/r_2 - 1/r_1) \qquad (\text{Eq. 2})$$

The tendency of the system is to equalize these pressures either by breaking the lamellar film separating the bubbles, or by diffusion of the air from small to large bubbles. These two mechanisms of reducing the potential energy of the system lead to formation of worm-like or dendritic defects by growth or coalescence of small bubbles.

$\Delta P$ across the lamellar film surrounding a bubble is proportional to the surface tension of PVB (Eq. 1 and 2). Using appropriate additives we can lower the surface tension of PVB, which in turn will decrease $\Delta P$, stabilize the bubbles and prevent bubbles from growing or coalescing to form worm-like or dendritic defects.

The surface energy is determined by the contact angle method which is known in the art and is summarized here. A smooth surface on the PVB sheeting must be provided for this measurement. The surface pattern of PVB sheeting is smoothed by autoclaving between Mylar® polyester film (trademark of E. I. du Pont de Nemours & Co.). After peeling off the Mylar® the advancing and receding contact angles of water and methylene iodide on the PVB are measured using a Rame-Hart contact angle goniometer (Rame-Hart, Inc. Mountain Lakes, N.J.) The surface energy of the PVB is calculated from the average advancing contact angle using the harmonic-mean method which is described below. Preparation of PVB Interlayer for Contact Angle Measurement To measure the surface energy the surface roughness of the PVB interlayer must be removed. The PVB interlayer is conditioned at 23% relative humidity to 0.5% moisture. It is then placed between additive-free Mylar® polyester film, and two pieces of glass, which are in contact with the Mylar®. By "additive free" it is meant that the surface of the film if free from coatings and the like. The PVB/Mylar®/glass assembly is pressed between two rolls at 20 psi (1.4 bar) and room temperature, heated in an oven at 90° C. for 30 minutes and roll pressed hot at 40 psi (2.7 bar). It is then vacuum bagged in polyethylene bags and autoclaved at 135° C. and 225 psi (15.3 bar) for 9 minutes. After cooling, the Mylar® is peeled off just before the contact angle measurement. A liquid drop in contact with a solid surface exhibits a contact angle, $\theta$. The contact angle formed by advancing the liquid front on a solid is called advancing, while the angle formed by receding the liquid front is called receding. Advancing and receding contact angles are measured while adding or withdrawing liquid from a drop in contact with the solid. Advancing contact angles are usually greater than receding for systems in a metastable state. The difference between an advancing and receding contact angle is called contact angle hysteresis and reflects the heterogeneity and roughness of the solid surface. A perfectly smooth and chemically homogeneous surface shows zero contact angle hysteresis. Advancing and receding contact angles of water and methylene iodide are measured at three different locations on a smooth piece of PVB, approximately 1 in.×3 in. (25 mm×76 mm), using a Rame-Hart goniometer and a precise microsyringe to control the volume of the liquid drop. The surface energy of the PVB sheet is calculated from the average advancing contact angle using the Harmonic-Mean method.

Harmonic-Mean Method

The forces that bind or repel materials can be described as dispersion and polar. Dispersion forces are due to London forces and polar are due to dipole-dipole, dipole induction and hydrogen bonding. The contact angle of a dispersive liquid such as methylene iodide on a surface reflects the dispersive component of the surface. Similarly, the contact angle of a polar liquid like water on a surface reflects the polar component of the surface. The sum of these forces equals the total surface tension.

The harmonic-mean method calculates the polar and dispersive components of a solid surface tension, $\gamma$. By relating the contact angles of two testing liquids, Young's equation and the harmonic-mean, we obtain $$(1 + \cos\theta_1)\gamma_1 = 4\left(\frac{\gamma_1^d \gamma_s^d}{\gamma_1^d + \gamma_s^d} + \frac{\gamma_1^p \gamma_s^p}{\gamma_1^p + \gamma_s^p}\right) \qquad \text{Eq. 3}$$

$$(1 + \cos\theta_2)\gamma_2 = 4\left(\frac{\gamma_2^d \gamma_s^d}{\gamma_2^d + \gamma_s^d} + \frac{\gamma_2^p \gamma_s^p}{\gamma_2^p + \gamma_s^p}\right) \qquad \text{Eq. 4}$$

where, $\gamma = \gamma^p + \gamma^d$. The superscripts p and d refer to polar and dispersive surface tensions. The subscripts 1 and 2 refer to the testing liquids. If $\gamma_j^d$ and $\gamma_j^p$ of the testing liquids (j=1 and 2) are known, the dispersive $\gamma_s^d$ and polar $\gamma_s^p$ components of the solid surface tension can be obtained from the contact angles $\theta_1$ and $\theta_2$ by solving the two quadratic equations simultaneously. Water and methylene iodide are two convenient testing liquids whose $\gamma^d$ and $\gamma^p$ are listed in Table 1. Two mathematically correct roots, but only one physically meaningful, are calculated by solving Eq. 3 and 4 simultaneously. The calculations are performed by a FORTRAN computer program which is described by S. Wu at pages 613–618 in "Polymer Interface and Adhesion" Marcel Dekker, Inc., New York, N.Y.(1982). Table 1: Surface Energy of Water and Methylene Iodide Used to Calculate Surface Energies of Solid Polymers from Contact Angles.

| Liquid | $\gamma$ | $\gamma^d$ | $\gamma^p$ |
|---|---|---|---|
| Water | 72.8 | 22.1 | 50.7 |
| Methylene Iodide | 50.8 | 44.1 | 6.7 |

Adhesion Testing

Adhesion of the laminate, i.e. of the PVB interlayer to glass, is determined using the compressive shear strength test using the jig 10,12 shown in the FIGURE. Laminates for adhesion determination are prepared by first conditioning the polyvinylbutyral interlayer at 23° C.±2° C. in an environment of 23±3% relative humidity overnight before laminating. Referring to the FIGURE, the interlayer 18 is then sandwiched between two pieces of annealed float glass 16 and 20 of dimension 12"×12" (305 mm×305 mm) and 2.5 mm nominal thickness which have been washed and rinsed in demineralized water. The glass/interlayer/glass assembly is then heated in an oven set at 90–100° C. for 30 minutes. Thereafter, it is passed through a set of nip rolls so that the air in the void spaces between the glass and the interlayer may be squeezed out, and the edge of the assembly sealed. The assembly at this stage is called a pre-press. The pre-press is then placed in an air autoclave where the temperature is raised to 135° C. and pressure to 200 psig (14.3 bar). These conditions are maintained for 20 minutes, after which, the air is cooled, while no more air is added to the autoclave. After 20 minutes of cooling when the air temperature in the autoclave is under 50° C., the excess air pressure is vented.

The compressive shear strength of the laminate prepared as prescribed above is determined using the method detailed here. Six 1"×1" (25 mm×25 mm) chips are sawed from the laminate. The chips are allowed to conditioned in a room controlled at 23° C.±2° C. and 50%±1% relative humidity for one hour prior to testing. The compressive shear strength of the chip is determined using the jig shown in the FIGURE. The chip 16, 18,20 is placed on the cut-out on the lower half of the jig 12, and the upper half 10 is then placed on top of the chip. A cross-head is lowered at the rate of 0.1 inch per minute (2.5 mm per minute) until it contacts the upper piece of the device. As the cross-head continues to travel downward, one piece of the chip begins to slides relative to the other. The compressive shear strength of the chip is the shear stress required to cause adhesive failure. The precision of this test is such that one standard deviation is typically 6% of the average result of six chips. An interlayer tested in this way for adhesion which has compressive shear strength of 1400 psi to 4000 psi (1000 N/cm$^2$ to 2700 N/cm$^2$) is considered suitable for use in automobile windshields and automotive side-glass and backlites.

Torture Test

Laminates for the torture test are prepared in the same manner as the ones for the compressive shear strength test except that the laminate size is 150 mm×300 mm. After lamination, each laminate is inspected for visible defects such as bubbles, worm-like or finger-like delamination. If any visible defects are found in a laminate, it is rejected, and another laminate is prepared in its place for the torture test. Two laminates of 150 mm×300 mm from each PVB interlayer are made for the purpose of the torture test.

Laminates without any visible defects are placed in a container filled with water. The container is covered with a loosely fitted lid to avoid splashing while the container is being moved. The entire container with lid is put in an air autoclave where the temperature is raised to 140° C. and the pressure to 150 psig (10.2 bar). These conditions are maintained for 4½ hours, after which the air in the autoclave is cooled for 75 minutes while the pressure is allowed to drop due to the decrease in temperature according to the ideal gas law. When the container is removed from the autoclave, and the lid is removed, air can be seen bubbling from the water although the water temperature is only about 60° C.

The laminates are allowed to sit overnight at room temperature. In a few hours but usually overnight, worm-like defects commonly referred to as delamination and bubbles would develop in some of the test laminate samples. The length of edges occupied by worm-like delamination in each sample is recorded. The length of edges with worm-like defects is the sum total of all the lengths of the defects in that sample. After recording the observations, the laminates are baked in an 80° C. oven for two hours at atmospheric pressure to drive out of solution the remaining air and part of the moisture which might have been absorbed during the torture autoclave cycle. After the laminates are cooled to room temperature, they are examined for defects again. The worm-like delamination length in each laminate is recorded. Changes in defect lengths in the same sample as a result of this baking step can be correlated with the bulk surface energy of the plasticized polyvinylbutyral interlayer.

Haze Testing

Laminates are prepared as described above. The diffusive light transmission and the total transmission are measured according to ASTM D-1003 by using a Hazegard XL211 hazemeter (BYK Gardner-USA). Percent-haze is the diffusive light transmission as a percent of the total light transmission. Laminates with haze greater than 0.35% are not considered suitable particularly for windshields.

EXAMPLES

The following examples in which parts and percentages are by weight unless otherwise specified further illustrate this invention.

Comparative Example C1

Plasticized polyvinylbutyral sheeting in which the plasticizer was tetraethylene glycol di-heptanoate, commercially available as Butacite®, trademark for E. I. du Pont de Nemours' polyvinylbutyral sheeting, was used to prepare laminates according to the method described above. The composition contained 335 ppm potassium as the adhesion control agent in the form of potassium formate. The sample had an adhesion level of 3096 psi (2133 N/cm$^2$) in compressive shear strength. The total surface energy, which is a property of the bulk of the PVB interlayer, was measured to be 53.2 dynes/cm. Two laminates were prepared for torture testing as described above. Half of the laminates developed worm-like delamination after the torture autoclave torture cycle. The defects grew substantially after baking

Example 1

100 Parts by weight polyvinyl butyral is admixed in an extruder with 38.5 parts plasticizer doped with antioxidants (octylphenol) and ultraviolet light stabilizers (Tinuvin P), and 0.1 part of a polyoxyethylene-modified silicone oil (Silwet® L-7604, OSi Specialties, Inc.). Except for the modified silicone oil, this composition is the same as that in Comparative Example 1. The admixture is forced through a slit-die so that it becomes a nominally 0.76 mm sheeting in the process detailed above. Potassium formate was added to the melt in the extruder such that the potassium concentration in the sheeting was 300 ppm. The surface energy of the said sheeting was measured to be 50.8 dynes/cm. The sample had an adhesion level of 3199 psi (2204 N/cm$^2$) in compressive shear strength. Two laminates were prepared for torture testing using the method described above. They were subjected to the torture test described. There were no worm-like delaminations in either laminate after either the autoclave or the baking cycle of the torture test.

Example 2

The polyvinyl butyral interlayer in this example is similar to that used in Example 1, except that the level of the polyoxyethylene modified silicone oil was 0.5 parts. The total bulk surface energy of the interlayer was 51.7 dynes/cm. The adhesion level was 2485 psi (1712 N/cm$^2$) in compressive shear strength. None of the laminates developed worm-like delamination after the torture autoclave cycle and bake cycles.

Comparative Example C2

The polyvinyl butyral interlayer in this example is similar to that used in Example 1, except that the level of the polyoxyethylene-modified silicone oil was 0.8 part and potassium formate was not used as an adhesion control additive. The adhesion level was 2249 psi (1552 N/cm$^2$) in compressive shear strength. Haze of the laminate was 0.84%. Although adhesion is in the proper range, laminates from this PVB interlayer are too hazy for use as automobile windows.

Example 3

The polyvinyl butyral interlayer in this example is similar to that of Example 1, except that the poly-oxyethylene modified silicone oil is replaced by 0.03 part of an hydrolyzed γ-glicydoxypropyltrimethoxy silane (Silquest® A-187, OSi Specialties, Inc.). The total bulk surface energy of the interlayer was 47.5 dynes/cm. The compressive shear strength level was 1874 psi (1291 N/cm$^2$). In the torture test, there were no worm-like delaminations after the autoclave cycle or the bake cycle.

Example 4

The polyvinyl butyral interlayer in this example is similar to that in Example 3, except that the level of hydrolyzed γ-glicydoxypropyltrimethoxy silane is 0.006 part. The total bulk surface energy of the interlayer was 47.3 dynes/cm. The compressive shear strength level was 3190 psi (2198 N/cm$^2$). In the torture test, there were no worm-like delaminations after the autoclave or the bake cycle.

Comparative Example C3

The polyvinyl butyral interlayer in this example is similar to that in Example 3, except that potassium formate was not added as an adhesion-control additive. The γ-glicydoxypropyltrimethoxy silane was not hydrolyzed before reaching the polymer melt. The compressive shear strength level was 4169 psi (2878 N/cm$^2$). Laminates from this PVB interlayer are not suitable for use in automobile windows because of their high adhesion.

Comparative Example C4

The polyvinyl butyral interlayer in this example is similar to that in Example 3, except that 0.07 part of aminopropyltriethoxysilane (Silquest® A-1100, OSi Specialties, Inc.) was added. The compressive shear strength level was 4994 psi (3448 N/cm$^2$). Laminates from this PVB interlayer are not suitable for use in automobile windows because their adhesion was too high.

Example 5

The interlayer in this example is the same as that in Example 1 except that the polyoxyethylene-modified silicone oil (Silwet® L-7604) level was 0.025 part, and in addition, 0.025 part of hydrolyzed γ-glicydoxypropyltrimethoxy silane was added. The total bulk surface energy of the interlayer was 47.5 dynes/cm. The adhesive level was 2857 psi (1969 N/cm$^2$). In the torture test, there were no worm-like delaminations after the autoclave or the bake cycle.

Comparative Example C5

The polyvinyl butyral interlayer in this example is similar to that in Example 3, except that 0.27 part of polyoxyethylene-modified silicone oil was also added and potassium formate was not used as an adhesion-control additive. The γ-glicydoxypropyltrimethoxy silane was not hydrolyzed before meeting with the polymer melt. Apparent cross-linking and gel formation caused plugging problems in the melt screen and the operating pressure was observed to increase continuously, making sustained extrusion impossible. The compressive shear strength level was 1997 psi (1379N/cm$^2$). The haze level was 0.47%. Laminates from this PVB interlayer are not suitable for use in automobile windows because of their high haze.

Comparative Examples C6–C8

These comparative examples illustrate the speed of the hydrolysis reaction of γ-glicydoxypropyltrimethoxy silane (Silquest® A-187) and its effect on laminate adhesion. In example C6, Butacite® PVB sheeting conditioned at 0.5% moisture was laminated to two pieces of nominally 2.5-mm float glass washed and rinsed in demineralized water. The compressive shear strength of the laminate was 2193 psi (1514 N/cm$^2$). In Comparative Example C7, a solution of 0.6 g of γ-glicydoxypropyltrimethoxy silane in 120 ml of n-hexane was wiped onto the surfaces of the glass pieces to be laminated. The glass was allowed to dry in a hood at room temperature before lamination to Butacite® as in C6. The compressive shear strength of the laminate was 2750 psi (1898 N/cm$^2$), which is a 25% increase over Example C6. In Example C8, the glass surfaces to be laminated were wiped with a solution of 0.6 g of γ-glicydoxypropyltrimethoxy silane in 20 ml of demineralized water and 100 ml of isopropyl alcohol. The silane solution was made up only minutes before the application and was kept at room temperature. The glass was allowed to dry in the hood after the application of the solution. The compressive shear strength of the resulting laminate was 1435 psi (991 N/cm$^2$), which is 35% lower in adhesion than the untreated sample of Example C6. Comparative examples C6–C8 show that the adhesion of the Butacite®/glass laminates increases when unhydrolyzed A-187 is used. On the contrary, hydrolyzed A-187 at the Butacite®/glass interface does not increase adhesion, but it decreases it, most likely by blocking active adhesion sites on the glass and Butacite®. It is clear that the improved delamination resistance in the examples where hydrolyzed γ-glicydoxypropyltrimethoxy silane was used was not due to any adhesion enhancement, but rather to its ability to lower the surface energy of the PVB.

Comparative Example 9

The PVB interlayer in this comparative example is the same as that in Comparative Example C1, except that this composition contained 400 ppm potassium as potassium formate as the adhesion control agent. The sample had an adhesion level of 2967 psi (2047 N/cm$^2$) in compressive shear strength. The total surface free energy was measured to be 53.2 dynes/cm. Two laminates were prepared as described above. Half the samples developed delamination after the baking cycle of the torture test.

Example 6

100 Parts by weight polyvinyl butyral is admixed in an extruder with 38.5 parts plasticizer (of Example C1) doped with antioxidants (octylphenol) and ultraviolet light stabilizers (Tinuvin P), 0.1 part of Zonyl® FSP fluorosurfactant. Except for the Zonyl® FSP fluorosurfactant, this composition is the same as that in Comparative Example C9. The admixture is forced through a slit-die so that it becomes a nominally 0.76 mm sheeting. Potassium formate was added to the melt in the extruder such that the potassium concentration in the sheeting was 400 part per million by weight of the plasticized sheet. The adhesion level was 2777 psi (1916 N/cm$^2$) in compressive shear strength. The total bulk surface energy of the interlayer was 51.3 dynes/cm. Two laminates were prepared for the torture test using the method described above. They were subjected to the torture test described. No worm-like delaminations were observed in any of the samples after the autoclave or the bake cycle.

Comparative Example C10

Comparative Example C9 was repeated, except that the sample had an adhesion level of 2259 psi (1559 N/cm$^2$) in compressive shear strength. The total surface energy, which is a property of the bulk of the PVB interlayer, is measured at 53.2 dynes/cm. Two laminates were prepared as described above. Half of the samples developed worm-like delamination after the torture autoclave cycle which grew after the baking cycle.

Example 7

100 Parts by weight polyvinyl butyral is admixed in an extruder with 38.5 parts plasticizer (of Example C1) doped with antioxidants (octylphenol) and ultraviolet light stabilizers (Tinuvin P), 0.06 part of Zonyl® FSP fluorosurfactant. Except for the Zonyl® FSP fluorosurfactant, this composition is the same as that in Comparative Example C10. The admixture is forced through a slit-die so that it becomes a nominally 0.76 mm sheeting. Potassium formate was added to the melt in the extruder such that the potassium concentration in the sheeting was 400 part per million by weight of the plasticized sheet. The compressive shear strength level was 2608 psi (1800 N/cm$^2$). The total bulk surface energy of the interlayer was 50.4 dynes/cm. Two laminates were prepared using the method described above. They were subjected to the torture test described. There were no worm-like delaminations after the autoclave or the bake cycle. This illustrates clearly how additives which modify surface energy prevent the formation of delaminations.

What is claimed is:

1. A laminate comprising at least one layer of glass and a sheet of plasticized polyvinylbutyral, said polyvinylbutyral having incorporated therein an adhesion control agent to provide a preselected level of adhesion between said layer of glass and said sheet of polyvinylbutyral, and a surface energy modifying agent, said surface energy modifying agent being present in an amount sufficient to provide said sheet of polyvinylbutyral with a total surface energy of less than about 52 dynes/cm without substantially changing the preselected level of adhesion between said layer of glass and said sheet of polyvinylbutyral.

2. A laminate of claim 1 wherein said surface energy modifying agent is an organically modified silicone oil.

3. A laminate of claim 1 wherein said surface energy modifying agent is a hydrolyzed organically modified silane.

4. A laminate of claim 1 wherein said surface energy modifying agent is a fluorine-containing surfactant.

5. A laminate of claim 1 wherein said surface energy modifying agent is a salt of a medium to long chain carboxylic acid.

6. A laminate of claim 1 wherein said total surface energy is between 35 and 52 dynes/cm.

7. A laminate of claim 1 wherein said adhesion control agent is selected from the group consisting of an alkali metal or an alkaline earth metal or a transition metal salt of an organic acid.

8. A laminate of claim 1 wherein said preselected level of adhesion is from 1000 to 2700 N/cm$^2$.

9. A laminate of claim 8 wherein percent haze of the laminate measured according to ASTM D-1003 is not greater than 0.35%.

10. A process for imparting delamination resistance in glass/adhesive laminar structures, wherein said structures are comprised of at least one layer of glass and a sheet of plasticized polyvinylbutyral adhesive, wherein said delamination is caused by the presence of air dispersed in the adhesive, said process comprising the steps of: preparing a bulk composition of plasticized polyvinylbutyral containing an adhesion control agent, which provides a preselected level of adhesion between said glass and said sheet; incorporating a surface energy modifying agent in said composition, wherein the amount of surface energy modifying agent is selected to provide an adhesive sheet of plasticized polyvinylbutyral having a total surface energy between 35 and 52 dynes/cm; forming a laminar structure by adhering said sheet to a glass plate; de-airing the structure; and sealing said sheet and glass plate by applying heat and pressure thereto.

11. The process of claim 10 wherein said surface energy modifying agent is selected from the group consisting of an organically modified silicone oil, a hydrolyzed organically modified silane, a fluorine-containing surfactant, salt of medium- to long-chain carboxylic acid, or a combination thereof.

12. The process of claim 10 wherein said adhesion control agent is selected from the group consisting of an alkali metal or an alkali earth metal or a transition metal salt of an organic acid.

13. The process of claim 10 wherein said preselected level of adhesion is from 1000 to 2700 N/cm$^2$.

* * * * *